No. 854,208. PATENTED MAY 21, 1907.
H. G. GINACA.
MACHINE FOR CUTTING AND CONVEYING SUGAR CANE.
APPLICATION FILED JAN. 26, 1905. RENEWED APR. 18, 1907.
5 SHEETS—SHEET 2.
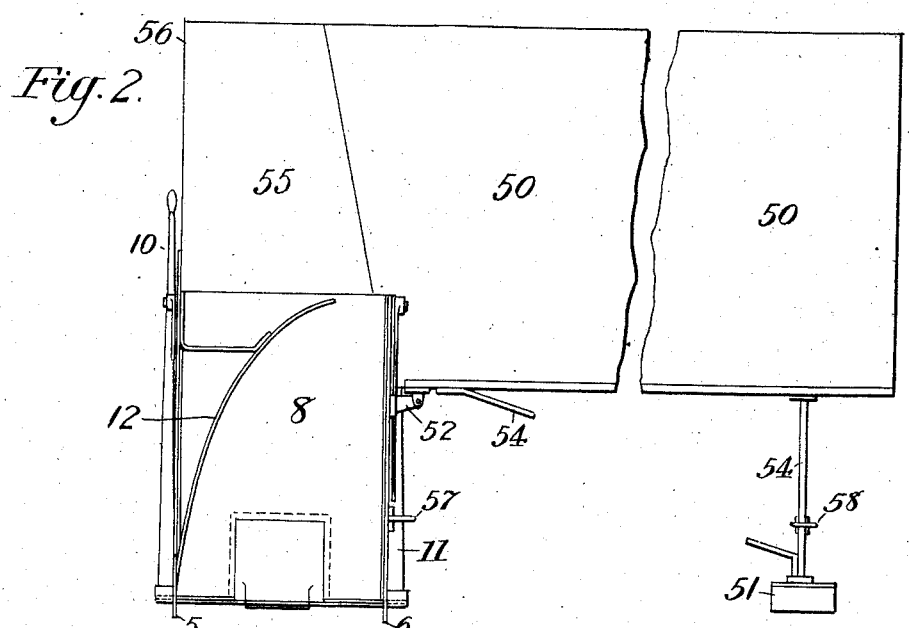
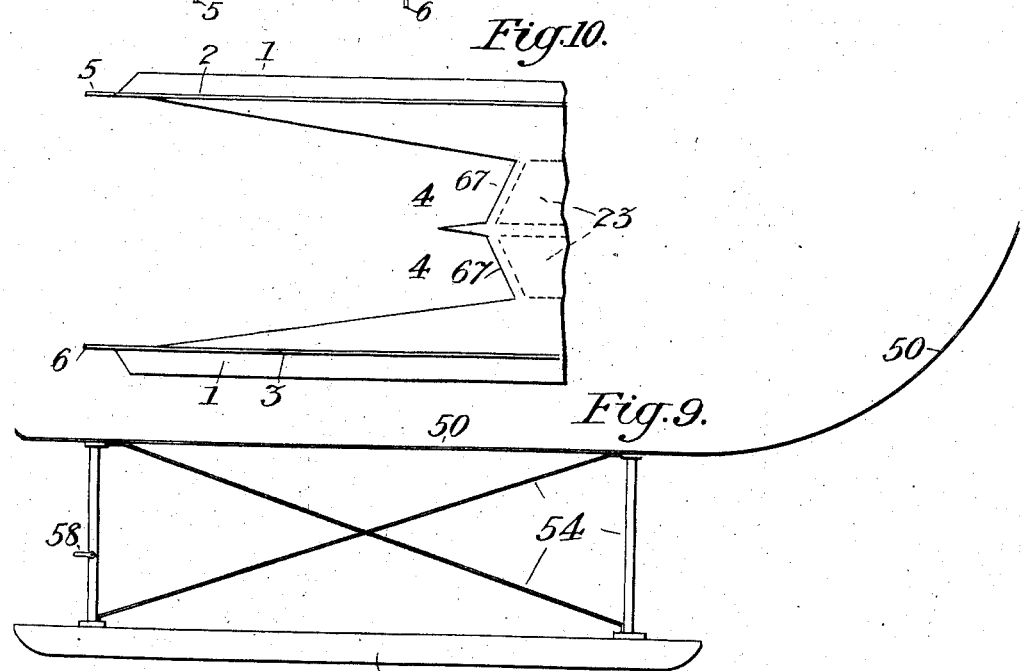

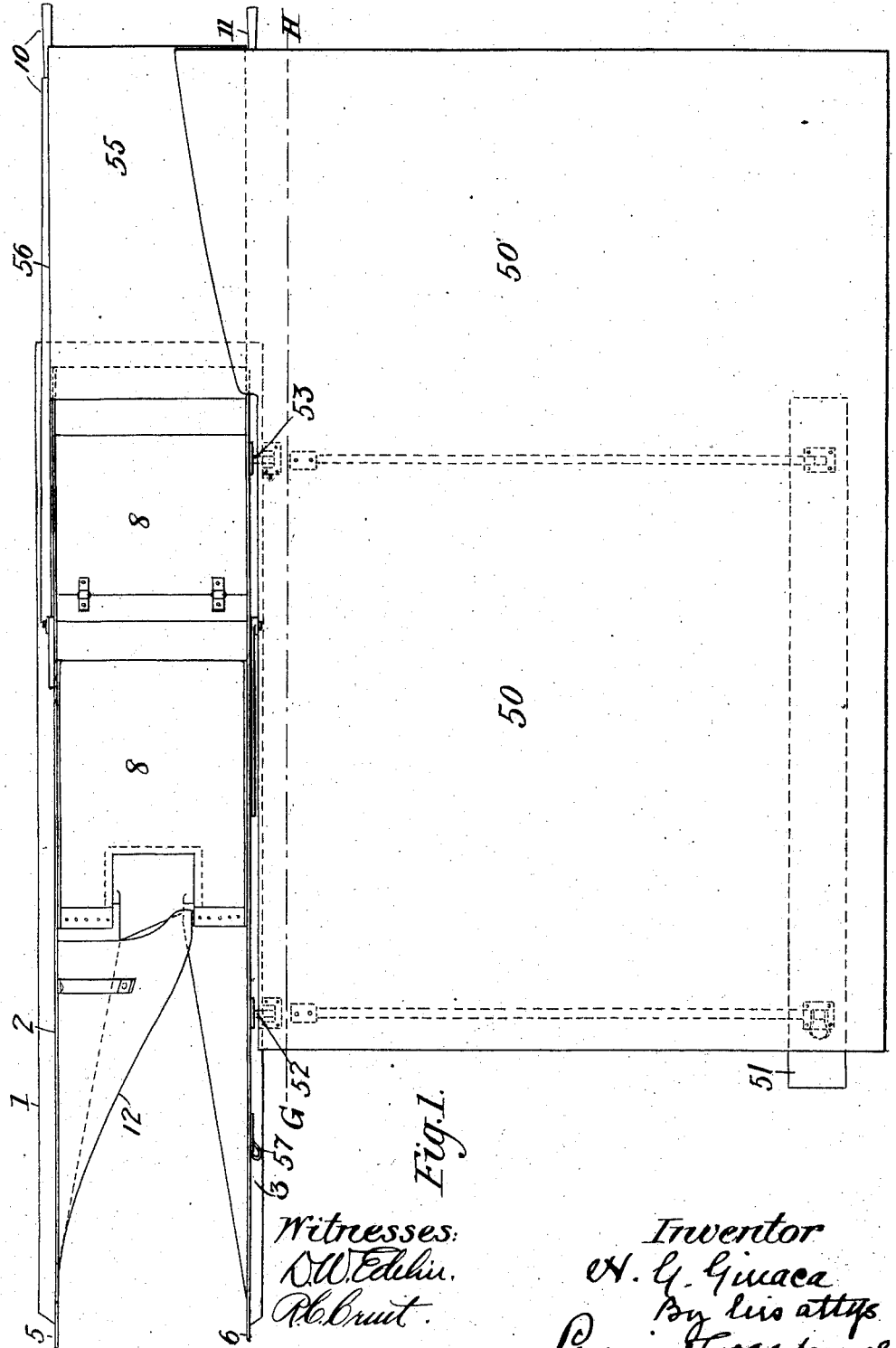

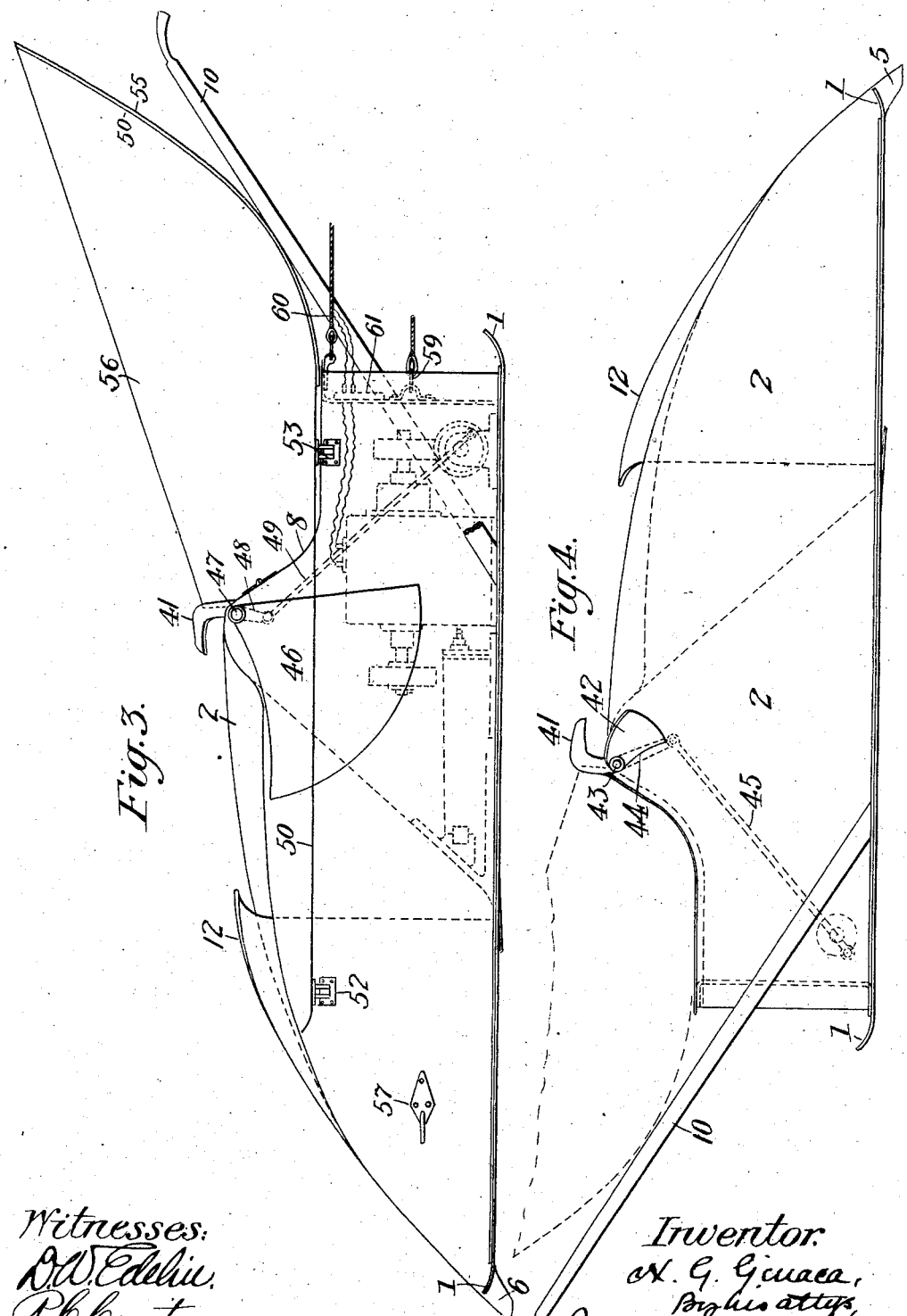

No. 854,208. PATENTED MAY 21, 1907.
H. G. GINACA.
MACHINE FOR CUTTING AND CONVEYING SUGAR CANE.
APPLICATION FILED JAN. 26, 1905. RENEWED APR. 18, 1907.
5 SHEETS—SHEET 4.
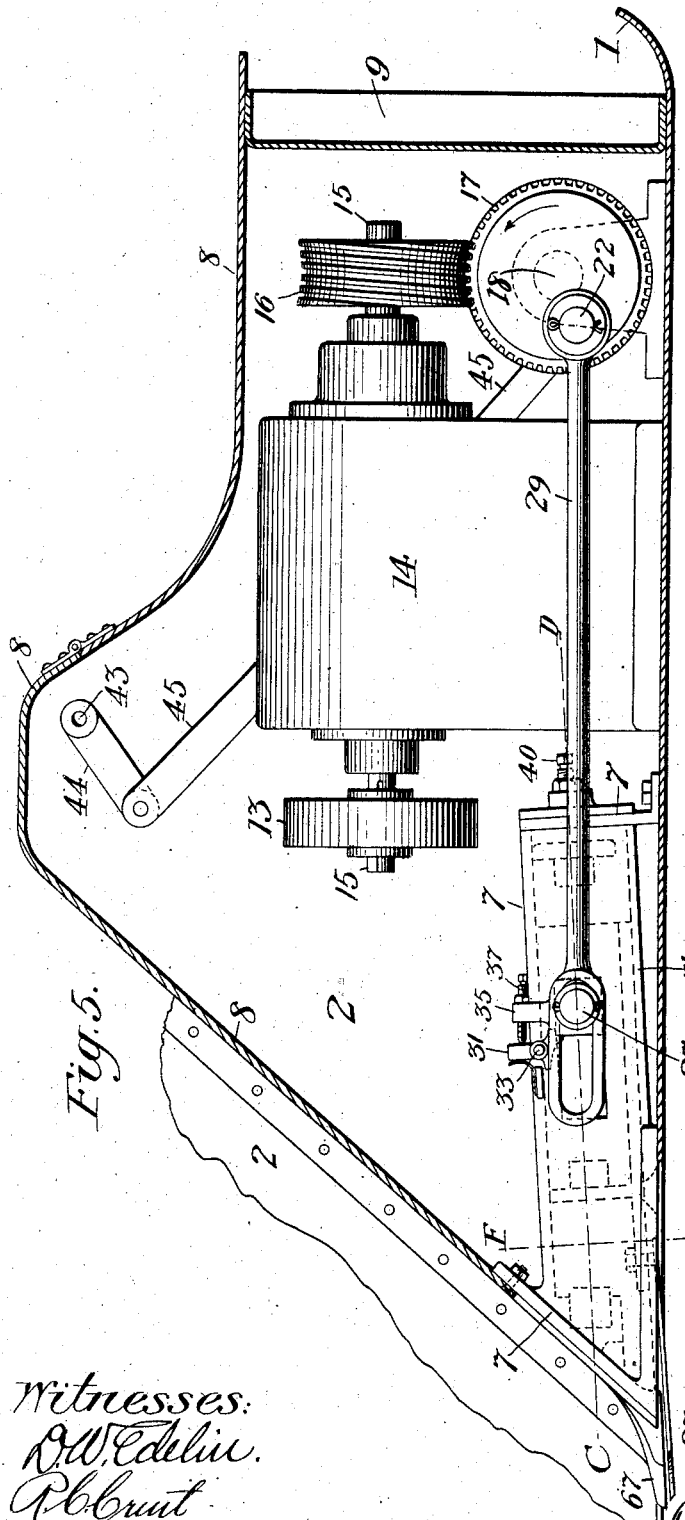
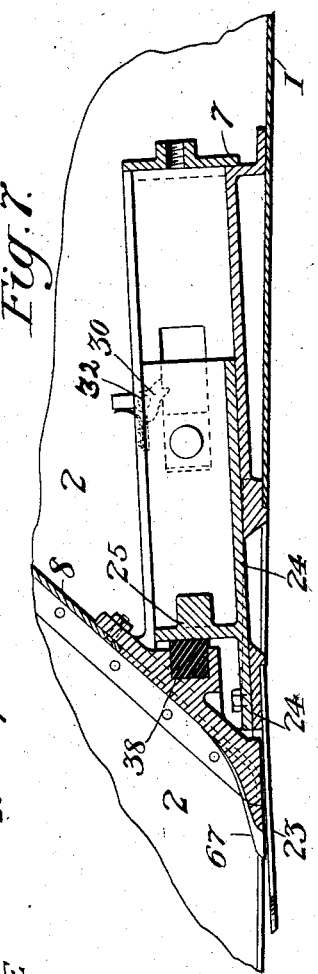
Witnesses:
Inventor:
H. G. Ginaca, No. 854,208. PATENTED MAY 21, 1907.
H. G. GINACA.
MACHINE FOR CUTTING AND CONVEYING SUGAR CANE.
APPLICATION FILED JAN. 26, 1905. RENEWED APR. 18, 1907.
5 SHEETS—SHEET 5.
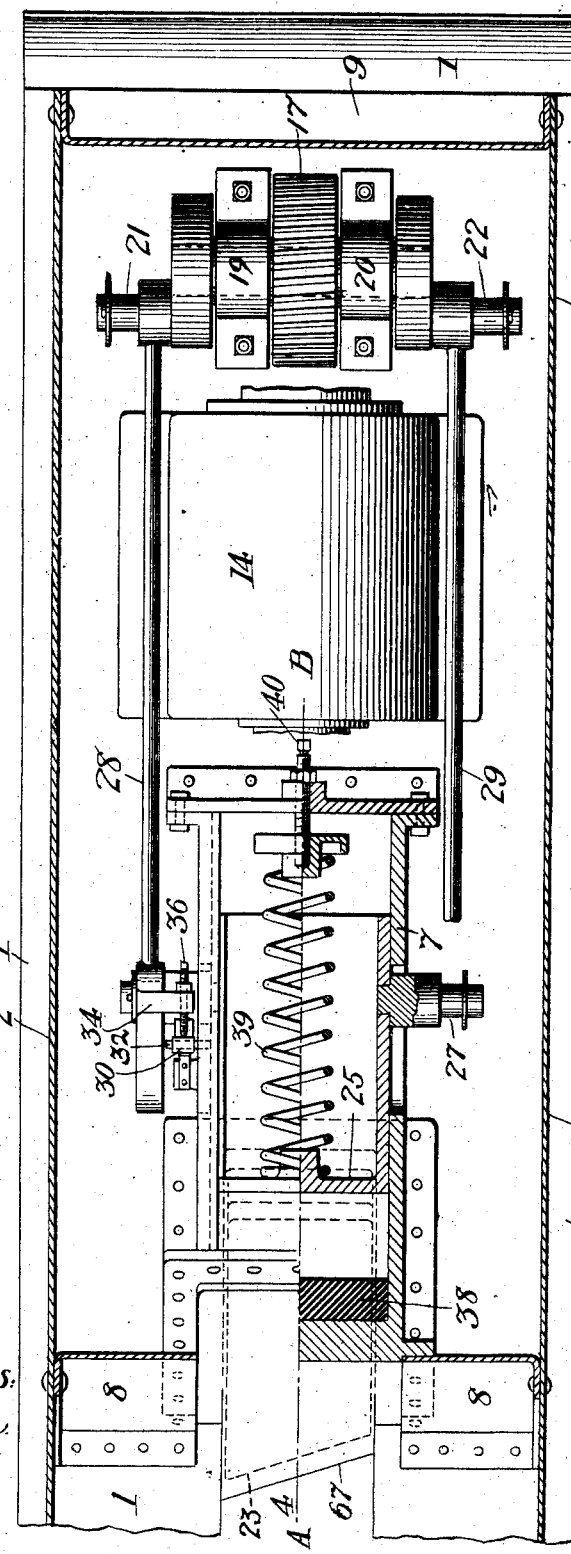
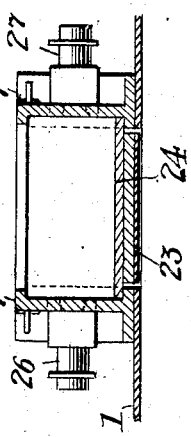

UNITED STATES PATENT OFFICE.

HENRY GABRIEL GINACA, OF HONOLULU, TERRITORY OF HAWAII, ASSIGNOR, BY DIRECT AND MESNE ASSIGNMENTS, OF TWO-FIFTHS TO ABRAHAM GARTENBERG, OF HONOLULU, TERRITORY OF HAWAII.

MACHINE FOR CUTTING AND CONVEYING SUGAR-CANE.

No. 854,208.        Specification of Letters Patent.        Patented May 21, 1907.

Application filed January 26, 1905. Renewed April 18, 1907. Serial No. 368,922.

*To all whom it may concern:*

Be it known that I, HENRY GABRIEL GINACA, a citizen of the United States, residing at Honolulu, Island of Oahu, Territory of Hawaii, have invented a new and useful Machine for Cutting and Conveying Sugar-Cane, of which the following is a specification.

This invention relates to machines for cutting and conveying sugar-cane; and has for its object to provide a machine of this kind which shall be suitable for use in connection with my system of harvesting sugar-cane, for which I filed application for Letters-Patent of the United States, December 15th 1904, Serial No. 237,010, and a machine of this kind which in simplicity, durability and efficiency shall possess superior advantages.

With these objects in view my invention consists in the construction and arrangement of parts, as will be hereinafter fully described and claimed, reference being had to the accompanying drawings, in which—

Figure 1 represents a plan view of a machine constructed in accordance with my invention; Fig. 2, a front elevation of the same; Fig. 3, an elevation and part section of the left side of the machine on the line G—H of Fig. 1; Fig. 4, an elevation of the right side; Fig. 5, a sectional elevation on a larger scale of a portion of the machine just back of the side-plate shown in Fig. 3; Fig. 6, a top plan view of the portion of the machine detailed in Fig. 5, one-half having the cover-plate removed, and one-half being a section on the line C—D of Fig. 5; Fig. 7, a sectional elevation of the portion on the line A—B of Fig. 6; Fig. 8, a transverse sectional elevation of a portion on the line E—F of Fig. 5; Fig. 9, a side elevation of the conveying apron; and Fig. 10, a plan view of a modification of crotch in forked end of base-plate.

Similar characters of reference indicate similar parts throughout the several views.

Referring to the drawings, it will be noted that the machine as a whole is adapted to be pulled or hauled in the field forward or backward in either direction, sliding upon the ground over the roots and stubble of the cut cane, in the manner as described in the above mentioned application, Serial No. 237,010. The base 1 is made of a rectangular steel plate with its forward end cut out as shown. Attached to and extending longitudinally on each side of the base-plate 1 are the vertical side-plates 2 and 3, preferably placed a short distance in from the longitudinal edges of the base-plate 1, as shown in Fig. 1. The forward ends of the side-plates 2 and 3 are tapered and end in the prongs 5 and 6 below the level of the base-plate 1, and the forward ends of the base-plate 1 are bent upward slightly, best shown in Figs. 3 and 4.

Secured to the base-plate 1 midway between the side-plates 2 and 3 is the casting 7, its forward portion covering the crotch 4 of the fork in the base-plate 1. The cover-plate 8, preferably made detachable, is attached to the front end of the casting 7 and the side-plates 2 and 3, and slopes upward and rearward from the base-plate 1 to the top of the side-plates 2 and 3, where it is bent over rearward and is continued with a downward and rearward slope to the rear of the machine. The cover-plate 8 may have a portion of it hinged as shown in Fig. 5. If desired, triangularly tapered pieces of wood or other suitable material may be filled in the spaces over the forked ends of the base-plate 1, inside of the forward ends of the side-plates 2 and 3. The rear end of the base-plate 1 is curved upward, and the vertical end-plate 9 incloses the space between the side-plates 2 and 3 and the base-plate 1 and the cover-plate 8. Attached to the side-plates 2 and 3 are the handles 10 and 11 respectively. The guide-plate 12, suitably secured to the right side-plate 2, curves over toward the left side-plate 3 as it rises from the base-plate 1, best shown in Fig. 2. The guide-plate 12 is cut so that its forward edge tapers upward and rearward starting from back of the prong 5, best shown in Figs. 1, 3 and 4. The tapering edge of the guide-plate 12 may either be rounded or rolled or curled upward.

For operating the several devices hereinafter described, I provide the motor 14, secured upon the base-plate 1, within the casing formed by the cover, end and side-plates as above described. The shaft 18 is mounted transversely of the center line of the machine and is journaled in the boxes 19 and 20 attached to the base-plate 1. The shaft 15 of the motor 14 is suitably geared to the shaft 18, by worm, spiral or bevel gearing. In the drawings the spiral-pinion 16 is shown keyed to the shaft 15 and meshing with the spiral-gear 17 keyed to the shaft 18. On each end of the shaft 18 is a disk with crank-pins, 21 and 22 respectively, set to line with each other. A flywheel 13 may be keyed to the motor-shaft 15.

The main cutting-knife 23 operates either within or just below the crotch 4 of the fork in the base-plate 1. The piece 24 is adapted to slide forward and backward in the casting 7, and the detachable knife 23 is secured underneath the forward end of the piece 24. A reciprocating motion of the piece 24, and its attached knife 23, might be effected in a well known manner by means of a pitman on either side of the piece 24, connecting its pins 26 and 27 with the crank-pins 21 and 22 respectively of the shaft 18 operated by the motor 14. But as such an arrangement does not give a suitable motion to the cutting-knife to produce the best results, I employ the following mechanism.

The pitmen 28 and 29 are slotted at their ends engaging the pins 26 and 27 of the piece 24, their other ends fitting over the crank-pins 21 and 22 respectively. Spring-pressed catches 30 and 31, pivoted to the casting 7 at 32 and 33 respectively, engage and hold the piece 24 when pulled to its rearward position. Adjustable trips for releasing the catches 30 and 31 are formed by means of the screws 36, 37 with lock-nuts in the lugs 34 and 35 on the tops of the slotted ends of the pitmen 28 and 29 respectively. The forward travel of the piece 24 is limited by its rib 25 striking against a rubber bumper 38 in the front end of the casting 7 and is cushioned thereby. Between the rib 25 and the rear of the casting 7 is interposed a spiral spring 39, a screw 40 being used to adjust its tension. It will be noted that the pull on the pins 26 27, projecting from the sides of the piece 24 through openings in the casting 7, by the pitmen 28 29 is a square and even pull, and that the piece 24 when pulled backward, sliding in the casting 7, compresses the spring 39. When pulled to its rear position, the catches 30 31 engage and hold the piece 24. The shaft 18 continuing to revolve, the slotted ends of the pitmen 28 29 slide forward on the pins 26 27 until the screws 36 37 in the lugs 34 35 engage and trip the catches 30 31, thereby allowing the spring 39 to force the piece 24 and its attached knife 23 rapidly forward, the pins 26 27 sliding in the slotted ends of the pitmen 28 29. These operations are repeated at each revolution of the shaft 18. It will be noted, Fig. 6, that the cutting-edge of the knife 23 when in its rear position is back of and under the lip 67 or forward edge of the casting 7, so that when the piece 24 is released an accelerated motion is imparted to the knife before its cutting-edge comes in contact with any cane. The knife 23 in moving forward beyond the lip 67 cuts any cane in its path within the crotch 4, its edge being at an angle such that a shearing cut is effected, shown in Fig. 6. The lip 67 is preferably made at the same angle as that of the knife 23, and it may be made of a separate piece instead of a part of the casting 7, if so desired. The travel of the knife 23 is slightly downward in moving forward, best shown in Figs. 5 and 7. If the knife 23 meets no resistance in its path the impact is taken up by the rib 25 of the piece 24 striking the rubber bumper 38. An air cushion or dash-pot may be employed in place of the rubber bumper 38.

In addition to the above described cutting mechanism, I employ a side-cutting device, its stationary knife 41 either being attached to or forming a part of the right side-plate 2 at its highest point, and projecting horizontally forward and vertically over said side-plate. Its movable knife 42 is pivoted outside of the side-plate 2 and moves in a plane parallel thereto about its pivot 43 passing through a suitable bearing in said side-plate. The knife 42 derives its motion by means of a pitman 45 connecting the crank-pin 21 of the shaft 18, operated by the motor 14, with the crank 44 attached to the pivot 43 inside of the side-plate 2. In Fig. 4 I have shown a shape of knife to effect a shearing cut, but I do not wish to confine myself to such shape.

A lifting-plate 46 is pivoted to swing in a plane parallel to and outside of the side-plate 3, its pivot 47 passing through a suitable bearing in the side-plate 3 to receive a crank 48 on the inside of said plate. A pitman 49 connects the crank 48 with the crank-pin 22 of the shaft 18, operated by the motor 14, thereby producing an oscillating motion of the lifting-plate 46.

If desired, the pitman 45 may connect the crank 44 of the side-cutting knife 42 with an eccentric on a countershaft suitably geared to the shaft 18 so as to run at a relatively slower speed than the main cutting mechanism. Likewise, the pitman 49 may connect the crank 48 with a similar eccentric on the other end of such a countershaft, whereby the motion of the lifting-plate 46 will remain the same but its speed will be relatively reduced.

To provide for the conveying of the cut cane, the apron 50 is detachably hinged to the side-plate 3 at 52 and 53, and is supported upon its shoe 51 by suitable bracing 54, best shown in Figs. 1, 2 and 9. For the sake of lightness, the apron 50 may be a wire netting or screen or be of canvas on a suitable frame. The apron 50 curves upward at its rear, and laps slightly over a similar curved apron 55 attached to the rear of the machine. The side-apron 56 is attached to the curved apron 55 and is in the same vertical plane as the side-plate 2, its top tapering from the rear of the side-cutting stationary knife 41 to the top of the apron 55. The curved apron 55 and the side-apron 56 are carried up high enough to protect the guiding operator.

The operation of my invention is as follows: The machine being constructed as above described, the hauling-forward cables are suitably attached, as at 57 to the side-plate 3 and at 58 to the bracing of the conveying apron, the hauling-backward cable is suitably attached, as for example, at 59 to the end-plate 9, and the electrically insulated flexible cable is attached at 60, and its wires connected to the switch 61 of the motor 14, best shown in Fig. 3. The machine is then pulled forward in the manner described in my application above mentioned, Serial No. 237,010, so that one row of cane will come between the prongs 5 and 6, the machine being guided by the operator by means of the handles 10 and 11, the prongs 5 and 6 being run low enough in the ground to insure their running under and lifting any cane stalks that may be slightly embedded in the ground. As the machine advances, the stalks inclined to either side of the row are lifted by the side-plates, the guide-plate 12 lifting that on the right-hand side of the row and forcing it gradually over toward the left side of the machine. The knife 23 cuts any cane in its path within the crotch 4. In some cases, such as when heavy stiff cane is to be cut, the guide-plate 12 is omitted, and the stalks inclined to either side of the row are only lifted by the prongs 5 and 6 and the side-plates 2 and 3. For fields where the cane is grown in wide rows, I make the crotch 4 in the base-plate 1 wider, and use a correspondingly wider knife, or two or more similar knives operated in a similar manner, as indicated in Fig. 10. The lifting-plate 46 automatically raises the cut cane resting on the side-plate 3 and which are forced upward upon it by the forward motion of the machine, and are raised by the lifting-plate 46 sufficiently so that they slide down upon the apron 50, the oscillating motion of the lifting-plate 46 being produced by the pitman 49 connecting the crank 48 with the crank-pin 22 of the shaft 18, operated by the motor 14 in the manner above described. The side-cutting device clears away any stalks that project over the path of the machine from adjacent rows on the right hand side of the machine, such stalks being lifted by the side-plate 2, as the machine advances, until they meet the knife 41 and are sheared by the movable-knife 42. Upon arrival at the end of the row, the cane on the apron 50 is removed, and the machine is pulled backward by the cable attached at 59 and the machine is then moved over to begin on the next row.

While I have described and illustrated the machine as right-handed, it is obvious that it could as well be made left-handed, if so desired.

I desire it understood that I do not limit myself either as to the details as shown or to the materials as specified, and that any changes in the construction or arrangement of the parts of the machine, which could be made by any skilled mechanic whereby the same results may be obtained, are included within the scope of my invention.

Having thus described my invention, what I claim as new, and desire to secure by Letters Patent, is—

1. In a machine for cutting and carrying sugar cane, the combination of a base plate acting as a shoe to support the machine and slide upon the ground, a cutting device, a motor for operating the cutting device, a casing on the base plate inclosing the motor, and operating connections between the motor and cutting device.

2. In a machine for cutting and carrying sugar cane, the combination of a base plate acting as a shoe to support the machine and slide upon the ground, a cutting device mounted on the base plate, a motor for operating the cutting device, means for attaching cables to the machine for hauling it in either direction, and operating connections between the motor and the cutting device.

3. In a machine for cutting and carrying sugar cane, the casting 7 provided with the lip or edge 67 at its forward end, the piece 24 adapted to slide forward and backward in said casting, a pitman pivoted to said piece 24, a motor connected to said pitman, and a knife 23 attached to said piece 24 and adapted to move under said lip.

4. In a machine for cutting and carrying sugar cane, the combination with the base-plate 1, having a fork with a crotch 4, of a lip 67 in said crotch, and a longitudinally reciprocating knife 23 operating below said lip, the cutting edge of said knife when at its rearward position being rearward of the said lip.

5. In a machine for cutting and carrying sugar cane, a base-plate forked at its forward end and adapted to slide upon the ground, a cutting-knife operating below the crotch of said fork, and a motor carried by said plate and connected to said knife.

6. In a machine for cutting and carrying sugar cane, a base-plate forked at its forward end, and a cutting-knife moving in a plane inclined slightly forward and downward to the plane of the base-plate.

7. In a machine for cutting and carrying sugar cane, a knife, the casting 7, the piece 24 adapted to slide forward and backward in the casting 7 and connected to said knife, pitmen connected to said piece 24 for drawing said piece to its rear position, and means for holding said piece in its rear position.

8. In a machine for cutting and carrying sugar cane, a knife, the casting 7, the piece 24 adapted to slide forward and backward in the casting 7 and connected to said knife, means for drawing said piece to its rear position, means for holding said piece in such position, and means for releasing said piece when so held.

9. In a machine for cutting and carrying sugar cane, a knife, the casting 7, the piece 24 adapted to slide forward and backward in the casting 7 and connected to said knife, means for drawing said piece to its rear position, means for holding said piece in such position, means for releasing said piece when so held, and means for adjusting the time of such release.

10. In a machine for cutting and carrying sugar cane, a knife, the casting 7, the piece 24 adapted to slide forward and backward in the casting 7 and connected to said knife, means for drawing said piece to its rear position, means for holding said piece in such position, means for releasing said piece when so held, and means for accelerating the motion of said piece forward when released.

11. In a machine for cutting and carrying sugar cane, a knife, the casting 7, the piece 24 adapted to slide forward and backward in the casting 7 and connected to said knife, means for drawing said piece to its rear position, means for holding said piece in such position, means for releasing said piece when so held, means for accelerating the motion of said piece forward when released, and means for adjusting the force of such acceleration.

12. In a machine for cutting and carrying sugar cane, a forked base-plate 1, side-plates 2 and 3, and a cutting device located at the upper portion of one of the said side-plates and at the edge of the machine.

13. In a machine for cutting and carrying sugar cane, a forked base-plate 1, a motor 14 thereon, side-plates 2 and 3, a stationary knife 41 at the upper edge of one of said side-plates, and a movable knife 42 pivoted to the same side-plate and deriving its motion from the motor 14, said knives coacting to shear any stalks introduced between them.

14. In a machine for cutting and carrying sugar cane, the combination with a base plate 1, of the side plates 2 and 3, and cutting means moving in a vertical plane located at the upper portion of one of the said side plates.

15. In a machine for cutting and carrying sugar cane, a base plate, side plates extending vertically therefrom, a side cutting device mounted upon one of said side plates; a lifting-plate pivoted to the side-plate opposite the side-cutting device, and a motor connected to said lifting plate.

16. In a cutting machine of the kind described, a base plate 1, the side plate 3 extending vertically therefrom, a lifting-plate 46, the pivot 47 in the side-plate 3, the crank 48 attached to said pivot inside of said plate, the shaft 18, the motor 14 connected thereto, the crank pin 22 of the shaft 18 and the pitman 49 connecting the crank with the crank pin 22.

17. In a machine for cutting and carrying sugar cane, a motor 14, a shaft 18 operated thereby, the casting 7, the piece 24 slidable in said casting, pins 26 and 27 extending from the piece 24, a disk upon each end of the shaft 18, crank pins 21 and 22 mounted respectively upon said disks, pitmen 28 and 29 each having a slot at one end, the slots in said pitmen receiving the pins 26 and 27 respectively, the other ends of said pitmen being respectively connected to the crank pins 21 and 22, a spring 39 interposed between said casting 7 and said knife piece 24, a knife 23 attached to said piece 24, spring pressed catches 30 and 31 pivoted to the casting 7, and adjustable strips 36 and 37 carried by the pitmen 28 and 29 respectively.

18. In a machine for cutting and carrying sugar-cane, a base plate, a side plate vertically extending therefrom, an apron detachably hinged to said side-plate at its upper edge, and a shoe supporting said apron at its outer end.

19. In a machine for cutting and carrying sugar cane, a base plate, a side plate extending vertically therefrom, an apron 50 hinged to the side plate near its top, the shoe 51 supporting the outer end of said apron, bracing 54 connecting the apron with the shoe, and means for attaching a hauling cable to said shoe.

In testimony whereof I have signed my name to this specification in the presence of two subscribing witnesses.

HENRY GABRIEL GINACA.

Witnesses:
ROBT. J. PRATT,
D. A. FOX.